(12) United States Patent
Kursula et al.

(10) Patent No.: US 10,326,330 B2
(45) Date of Patent: Jun. 18, 2019

(54) COOLING FAN ASSEMBLIES WITH SELECTIVELY ACTIVATED VIBRATION MODES

(71) Applicant: Intel Corporation, Santa Clara, CA (US)

(72) Inventors: Mikko Kursula, Lempäälä (FI); Kalle I. Makinen, Nokia (FI); Tapio Liusvaara, Tampere (FI)

(73) Assignee: INTEL CORPORATION, Santa Clara, CA (US)

( * ) Notice: Subject to any disclaimer, the term of this patent is extended or adjusted under 35 U.S.C. 154(b) by 191 days.

(21) Appl. No.: 15/238,114

(22) Filed: Aug. 16, 2016

(65) Prior Publication Data

US 2018/0051711 A1 Feb. 22, 2018

(51) Int. Cl.
| | |
|---|---|
| *H02K 7/06* | (2006.01) |
| *F04D 29/32* | (2006.01) |
| *H02K 9/06* | (2006.01) |
| *F04D 19/00* | (2006.01) |
| *F04D 25/10* | (2006.01) |
| *F04D 27/00* | (2006.01) |

(52) U.S. Cl.
CPC .......... *H02K 7/061* (2013.01); *F04D 19/005* (2013.01); *F04D 25/105* (2013.01); *F04D 27/001* (2013.01); *F04D 29/328* (2013.01); *H02K 9/06* (2013.01); *F05B 2270/504* (2013.01); *F05D 2270/303* (2013.01)

(58) Field of Classification Search
CPC ......... F04D 29/281; H02K 7/061; H02K 9/06
See application file for complete search history.

(56) References Cited

U.S. PATENT DOCUMENTS

| | | | | |
|---|---|---|---|---|
| 6,002,927 | A * | 12/1999 | Hayes, Jr. ............. | H02K 7/061 310/50 |
| 7,626,295 | B2 * | 12/2009 | Yamaguchi ........... | F04D 29/281 310/156.32 |
| 8,125,174 | B2 * | 2/2012 | Miyauchi ................. | H02P 8/02 318/685 |
| 2008/0002361 | A1 * | 1/2008 | Fagrenius ............. | H02K 7/061 361/695 |
| 2011/0194252 | A1 * | 8/2011 | Wang ..................... | A45B 27/02 361/695 |
| 2013/0236337 | A1 * | 9/2013 | Gummin ............... | F04B 43/043 417/412 |

* cited by examiner

*Primary Examiner* — Patrick Hamo
(74) *Attorney, Agent, or Firm* — Hanley, Flight & Zimmerman, LLC (57) ABSTRACT

Methods, apparatus, systems and articles of manufacture to implement cooling fans with selectively activated vibration modes are disclosed. An example cooling fan assembly includes a motor and a fan coupled to a shaft of the motor. The motor is to rotate the shaft in a first direction to cause the fan to move air. The motor is to rotate the shaft in a second direction to cause vibration from an eccentric mass coupled to the shaft.

19 Claims, 7 Drawing Sheets

COOLING FAN ASSEMBLIES WITH SELECTIVELY ACTIVATED VIBRATION MODES

FIELD OF THE DISCLOSURE

This disclosure relates generally to cooling fans, and, more particularly, to cooling fan assemblies with selectively activated vibration modes.

BACKGROUND

Many electronic devices include motors that serve various functions. For example, some motors may drive cooling fans to cool electrical components utilizing forced air. Other motors may produce haptic effects from vibrations caused by rotating an eccentric mass.

DETAILED DESCRIPTION

Small portable electronic devices (e.g., mobile phones, handheld gaming consoles, etc.) have not traditionally relied on cooling fans to generate forced air that assists in preventing electrical components from overheating. However, as processor thermal power levels have increased, cooling fans are being implemented more often within such devices. Some cooling fans are constantly rotated while the electronic device is powered. Other cooling fans may be activated and deactivated as needed based on a monitored thermal state of the device. Additionally or alternatively, the speed of rotation of a fan may vary depending on the thermal state of the device.

In addition to cooling fans, many modern electronic devices also implement haptic technology by, for example, generating vibrations to be felt by a user of such devices. While cooling fans may be operated for extended periods of times, vibratory haptic effects are typically intermittent and of a relative short duration (e.g., to alert a user). As such, many cooling fans are driven by a dedicated motor while vibratory haptic effects are accomplished by a separate motor structured to rotate an unbalanced mass as the need arises.

Examples disclosed herein use a single motor to rotate both a cooling fan and an eccentric mass on a single shaft. Thus, the examples disclosed herein eliminate the need for two separate motors (along with their separate housings and associated electrical driver circuitry) to rotate a fan for cooling and an eccentric mass for vibration effects. In this manner, the overall space requirements to provide forced air cooling and vibrations are significantly reduced relative to traditional approaches involving two separate motors. Furthermore, the elimination of the need for a second motor and the associated components has the potential to reduce the overall cost of components used in manufacturing such electronic devices.

More particularly, in accordance with the teachings disclosed herein, a cooling fan assembly is constructed with a single motor to selectively operate in (1) a cooling mode during which a fan is rotated without the rotation of an eccentric mass, and (2) a vibration mode during which the eccentric mass is rotated. In some examples, whether the motor is operating in the cooling mode or the vibration mode depends upon the direction of rotation of the motor. While there may be some vibrations produced by the fan when rotating in the cooling mode, such vibrations are negligible and/or below a threshold level needed to produce a haptic effect that would be noticeably perceived by a user. By contrast, the eccentric mass is structured to generate vibrations exceeding the threshold desired for the haptic effect.

In some examples, the eccentric mass is coupled to the motor shaft via a freewheel device. As used herein, a freewheel device refers to any type of rotational coupling device that enables free rotation relative to the shaft in one direction but fixes rotation relative to the shaft in the other direction. Example freewheel devices include unidirectional or one-way bearings and sprag clutches. Thus, when the shaft is rotating in a first direction corresponding to a free state of the freewheel device, the eccentric mass will not rotate with the shaft while a cooling fan coupled to the shaft will rotate. When the shaft is rotating in the opposite direction corresponding to a locked state of the freewheel device, the eccentric mass will rotate with the shaft, thereby causing vibrations. In some examples, a cooling fan may rotate in both directions because it is rigidly fixed to the shaft. In other examples, the cooling fan may be coupled to the shaft via a separate freewheel device positioned in the opposite direction to the freewheel device for the eccentric mass. In this manner, the fan is rotatably coupled to (e.g., rotates with) the shaft when rotating in the first direction, but rotatably decoupled from the shaft when rotating in the second direction while the eccentric mass is rotatably coupled to the shaft when rotating in the second direction but rotatably decoupled from the shaft when rotating in the first direction.

In other examples, the eccentric mass is formed from the blades of the cooling fan when the motor is operating in the vibration mode. More particularly, in some examples, individual ones of the fan blades are moveable relative to one another about a central axis of rotation. Thus, in some examples, when a motor is operating in a cooling mode, the fan blades are structured to be substantially evenly distributed or spaced apart circumferentially about the shaft for balanced rotation (e.g., negligible vibration below a threshold) that can generate desired movement of air for cooling. When the motor rotates in the opposite direction (corresponding to a vibration mode), the fan blades are structured to circumferentially shift relative to each other to collapse or be gathered into one or more unbalanced or eccentric groups of blades. The weight of the unbalanced grouping(s) of blades results in vibrations that may be used to generate a desired haptic effect.

Figure 1:
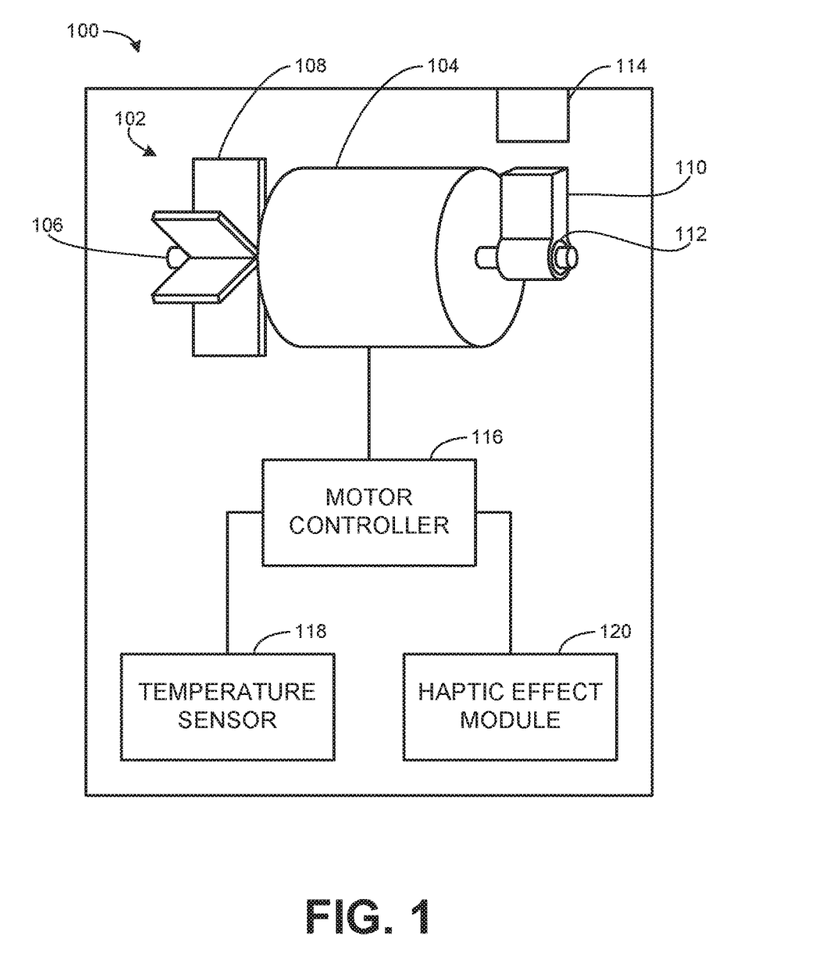
FIG. 1 illustrates an example electronic device including an example cooling fan assembly constructed in accordance with the teachings disclosed herein.

Turning in detail to the drawings, FIG. 1 illustrates an example electronic device 100 including an example cooling fan assembly 102 constructed in accordance with the teachings disclosed herein. In the illustrated example, the electronic device 100 may be a portable device such as, for example, a mobile phone (e.g., a smartphone), a tablet, a handheld gaming console, a smart watch, a virtual reality headset, and/or any other type of device that uses vibrations to generate haptic effects and uses the movement of forced air to cool electrical components.

In the illustrated example, the cooling fan assembly 102 includes a motor 104 that rotates a shaft 106. Additionally, the cooling fan assembly 102, shown in illustrated example of FIG. 1, includes a cooling fan 108 coupled to the shaft 106 and a separate eccentric mass 110 independently coupled to the shaft 106. In some examples, the eccentric mass 110 is coupled to the shaft 106 via a freewheel device 112. The freewheel device 112 enables the shaft 106 to freely rotate relative to the eccentric mass 110 in one direction (corresponding to a free state of the freewheel device 112) while rotationally coupling the eccentric mass 110 to the shaft 106 when rotating in the other direction (corresponding to a locked state of the freewheel device 112). A cross-sectional view of the example freewheel device 112 of FIG. 1 is shown and described in greater detail below in connection with FIG. 4.

In the illustrated example of FIG. 1, the fan 102 is rigidly fixed to the shaft 106 to rotate therewith. That is, regardless of the direction of rotation of the shaft 106, the fan 102 will rotate with the shaft. However, the eccentric mass 110 of the illustrated example will only rotate with the shaft in one direction (corresponding to the vibration mode) because it is only when the shaft 106 rotates in that direction that the freewheel device 112 is in the locked state to transfer the force of rotation to the eccentric mass 110. By contrast, when the shaft 106 of FIG. 1 rotates in the opposite direction (corresponding to the cooling mode), the eccentric mass 110 will not rotate because the freewheel device 112 is in the free state.

Although the eccentric mass 110 is rotationally decoupled from shaft 106 when the freewheel device 112 is in the free state so as not to be driven by the shaft 106, it is still possible for the eccentric mass 110 to move rather than remain in a fixed location. Accordingly, in some examples, the eccentric mass 110 is magnetic and/or includes a magnetic part that may be attracted to a magnet 114 positioned proximate the eccentric mass 110 to maintain the eccentric mass 110 in a fixed position when not in use. In some examples, the magnet 114 is a permanent magnet. In other examples, the magnet 114 is an electromagnet. In some such examples, the magnet 114 is activated or energized when the eccentric mass 110 is not in use (e.g., during the cooling mode) and deactivated when the eccentric mass 110 is being used (e.g., during the vibration mode).

When the motor 104 is operating in the vibration mode, the reverse direction of the fan 108 may affect the ability of the fan 108 to cool the components of the electronic device 100 because the eccentric mass 110 will also be rotating about the shaft 106. However, this concern may be negligible because the reverse rotation of the fan 108 is typically limited to brief intermittent periods of time. Furthermore, in some examples, if the cooling fan 108 needs to be rotated to maintain the thermal state of the electronic device 100 within acceptable limits, the vibration mode can be suppressed or overridden to maintain the cooling fan assembly 102 operating in a cooling mode.

In the illustrated example, the fan 108 is shown as an axial fan. However, in other examples, the fan 108 may alternatively be a radial fan. In examples, where the fan 108 is a radial fan, reversing the direction of rotation of the shaft 106 (e.g., from the cooling mode to the vibration mode) will reverse the direction of movement of air forced by the fan 108. In some examples, this may be undesirable. Accordingly, in some examples, the fan 108 may be coupled to the shaft 106 via a second freewheel device positioned in the opposite direction to the freewheel device 112 associated with the eccentric mass 110. In such examples, the fan 108 will rotate with the shaft 106 in one direction without rotation of the eccentric mass 110 (e.g., during a cooling mode) and the eccentric mass 110 will rotate with the shaft 106 in the other direction without rotation of the fan 108 (e.g., during a vibration mode).

As shown in FIG. 1, the example electronic device 100 is provided with a motor controller 116 to drive the motor 104. The motor controller 116 may be any type of controller and may be implemented independent of or in association with other processing functions of the electronic device 100. In the illustrated example, the electronic device 100 includes a temperature sensor 118 and a haptic effect module 120 both in communication with the motor controller 116. In some examples, the temperature sensor 118 monitors a temperature of the electrical components of the electronic device 100. In some examples, the haptic effect module 120 generates signals indicating when a vibratory haptic effect is to be generated (e.g., based on input from a user of the device 100 and/or other processes operating in the device 100).

In the illustrated example, the motor controller 116 may control rotation of the motor (e.g., speed and/or direction) based on the inputs received from the temperature sensor 118 and/or the haptic effect module 120. For example, if the monitored temperature exceeds a first thermal threshold, the motor controller 116 may activate the cooling mode of the motor to cause the fan 108 to force air to move over the electrical components. So long as the temperature does not exceed a second higher threshold, the motor controller 116 may intermittently switch to the vibration mode to generate a vibration effect based on signals received from the haptic effect module 120. If the monitored temperature exceeds the second thermal threshold, the motor controller 116 may maintain the motor 104 operating in the cooling mode regardless of whether the haptic effect module 120 indicates a haptic effect is to be generated until the temperature drops below the second threshold.

While an example manner of implementing the electronic device 100 of FIG. 1 is illustrated in FIG. 1, one or more of the elements, processes and/or devices illustrated in FIG. 1 may be combined, divided, re-arranged, omitted, eliminated and/or implemented in any other way. Further, the example motor controller 116, the example temperature sensor 118, the example haptic effect module 120, and/or, more generally, the example electronic device 100 of FIG. 1 may be implemented by hardware, software, firmware and/or any combination of hardware, software and/or firmware. Thus, for example, any of the example motor controller 116, the example temperature sensor 118, the example haptic effect module 120, and/or, more generally, the example electronic device 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example motor controller 116, the example temperature sensor 118, and/or the example haptic effect module 120 is/are hereby expressly defined to include a tangible computer readable storage device or storage disk such as a memory, a digital versatile disk (DVD), a compact disk (CD), a Blu-ray disk, etc. storing the software and/or firmware. Further still, the example electronic device 100 of FIG. 1 may include one or more elements, processes and/or devices in addition to, or instead of, those illustrated in FIG. 1, and/or may include more than one of any or all of the illustrated elements, processes and devices.

Figure 2:
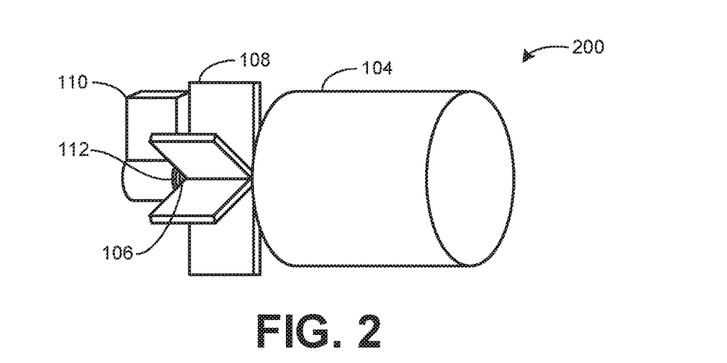
FIG. 2 illustrates another example cooling fan assembly that may be utilized in the example electronic device of FIG. 1.

FIG. 2 illustrates another example cooling fan assembly 200 that may be utilized in the example electronic device 100 instead of the cooling fan assembly 102 of FIG. 1. The example cooling fan assembly 200 of FIG. 2 is similar to the cooling fan assembly of FIG. 1 except for the relative position of each of the motor 104, the fan 108, and the eccentric mass 110. As shown in FIG. 1, the motor 104 is disposed between the fan 108 and the eccentric mass 110. Thus, the shaft 106 extends beyond both ends of the motor 104. In other examples, as shown in FIG. 2, both the cooling fan 108 and the eccentric mass 110 are located at the same end of the motor 104. Thus, in some examples, the shaft 106 may only extend beyond one end of the motor 104.

Figure 3:
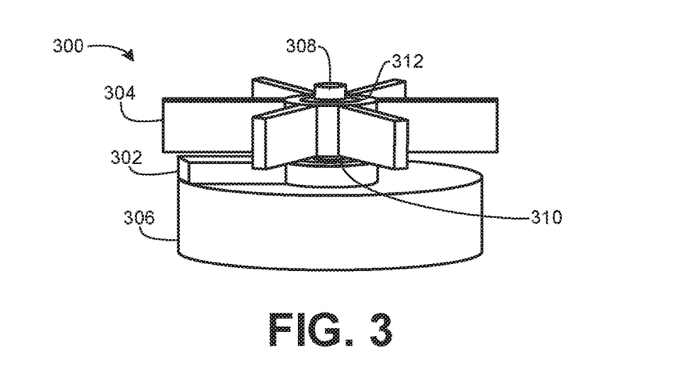
FIG. 3 illustrates another example cooling fan assembly that may be utilized in the example electronic device of FIG. 1.

FIG. 3 illustrates another example cooling fan assembly 300 that may be utilized in the example electronic device 100 instead of the cooling fan assembly 102 of FIG. 1. In the illustrated examples, an eccentric mass 302 is disposed between a cooling fan 304 and a motor 306. The example cooling fan 300 of FIG. 3 is different in shape than the cooling fan assemblies 102, 200 of FIGS. 1 and 2. In particular, the cooling fan assemblies 102, 200 of FIGS. 2 and 3 are generally bar shaped with a length in a direction along the shaft 106 that is greater than a width measured in a direction perpendicular to the shaft 106 (e.g., corresponding to the span or diameter of the fan 108). By contrast, the example cooling fan 300 of FIG. 3 is generally coin shaped with a length in a direction along the shaft 308 that is less than a width a direction perpendicular to the shaft 308. In some examples, coin shaped cooling fan assemblies have a length ranging between approximately 3 mm and 5 mm and the width (e.g., diameter) ranging between approximately 10 mm and 20 mm. In some examples, the particular size and/or shape of the cooling fan assembly and its component parts may be based on trade-offs between different considerations. For example, a larger fan can move more air than a smaller fan for improved cooling, but this takes up more space than a smaller fan. Similarly, a larger diameter for the path followed by the eccentric mass (typically similar to the diameter of the fan) generally results in a center of mass further away from the shaft, which reduces the required weight of the mass to provide adequate vibrations.

As with the cooling fan assemblies 102, 200 of FIGS. 2 and 3, the example cooling fan assembly 300 of FIG. 3 includes a first freewheel device 310 to couple the eccentric mass 302 to the shaft 308 to enable the shaft 308 to rotate in a first direction without movement of the eccentric mass 202. Further, the illustrated example of FIG. 3 shows a second freewheel device 312 to couple the fan 304 to the shaft 308. In some examples, the first and second freewheel devices 310, 312 are oriented in opposite directions so that one is in a free state while the other is in a locked state. In this manner, when the shaft 308 rotates in a first direction corresponding to a cooling mode, the fan 304 will rotate while the eccentric mass 302 will remain rotationally decoupled from the shaft 308; whereas when the shaft 308 rotates in a second direction corresponding to a vibration mode, the eccentric mass 302 will rotate while the fan 304 will remain rotationally decoupled from the shaft 308.

Figure 4:
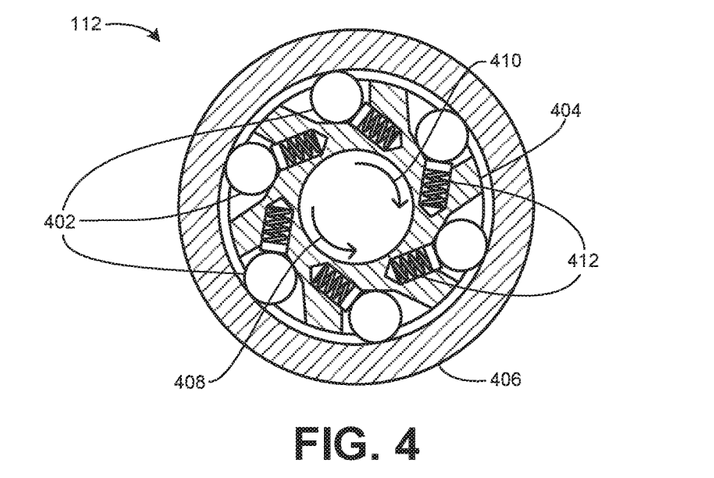
FIG. 4 illustrates a cross-sectional view of the example freewheel device of FIG. 1

FIG. 4 illustrates a cross-sectional view of the example freewheel device 112 of FIGS. 1 and 2, which may be the same or similar to the freewheel device 310 of FIG. 3. As shown in the illustrated example, the freewheel device 112 includes a plurality of rollers 402 disposed between an inner race 404 and an outer race 406. In some examples, the inner race 404 is fixedly attached to the shaft 106 to rotate as the shaft 106 rotates. The outer race 406 may be fixedly attached to the eccentric mass 110.

When the shaft 106 (and, thus, the inner race 404) rotates in a first direction 408 (counterclockwise in the illustrated example), the rollers 402 have space to rotate between the races 404, 406 such that the freewheel device 112 is in a free state. In the free state, torque is not transferred from the inner race 404 to the outer race 406 such that the outer race 406 (and, thus, the eccentric mass 110) will not rotate as the shaft 106 (with the inner race 404) rotates. By contrast, when the shaft (with the inner race 404) rotates in a second direction 410 (clockwise in the illustrated example), the rollers 402 are wedged between the inner and outer races 404, 406, thereby placing the freewheel device 112 in a locked state. In the locked state, torque is transferred between the races such that the outer race 406 (with the eccentric mass 110) will rotate with the shaft 106 (with the inner race 404).

While the implementation of the example freewheel device 112 has been briefly described, different designs are possible. For example, although the freewheel device 112 is shown with springs 412 to bias the rollers 402 toward the outer race 406, other freewheel devices may include different types of biasing elements and/or have an inner race that does not use any biasing elements. Further, the freewheel device 112 may be implemented using balls instead of rollers. In other examples, the freewheel device may be a sprag clutch that uses sprags instead of rollers or balls between the races. Thus, the design of the freewheel device 112 may be adapted to the particular application in which the freewheel device 112 is to be used. Among other factors, design of the freewheel device will need to take into account the vibration forces produced by the rotation of the eccentric mass 110.

Figure 5:
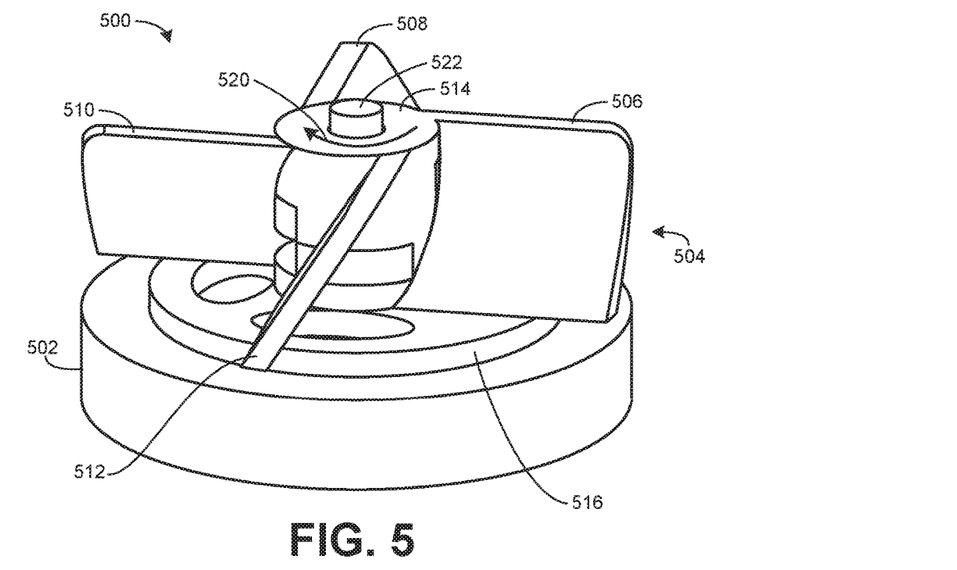
FIG. 5 illustrates another example cooling fan assembly with a collapsible fan that may be utilized in the example electronic device of FIG. 1 when rotated in a first direction.
Figure 6:
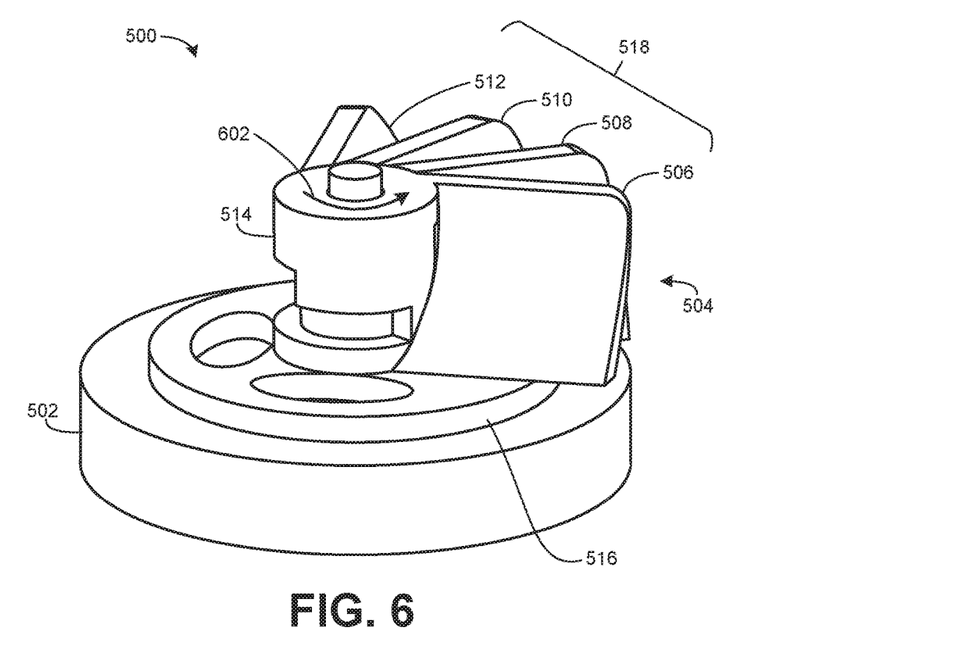
FIG. 6 illustrates the example cooling fan assembly of FIG. 5 when rotated in a second direction opposite the first direction.

FIG. 5 illustrates another example cooling fan assembly 500 with a motor 502 rotating a collapsible fan 504 in a first direction corresponding to a cooling mode. FIG. 6 illustrates the example cooling fan assembly 500 of FIG. 5 when the motor 502 is rotating the fan 504 in a second direction corresponding to a vibration mode. As shown in the illustrated examples, the collapsible fan 504 includes a fixed fan blade 506 and three moveable fan blades 508, 510, 512. The fixed fan blade 506 is rigidly attached to, or formed integrally with, a hub 514 through which the fan 504 may be coupled to a shaft of the motor 502. Thus, in the illustrated examples, the fixed fan blade 506 rotates with the rotation of the motor 502. In some examples, the fixed fan blade 506 and the hub 514 are rigidly fixed, or formed integrally with, a base plate 516 for mounting to the motor 502 as shown in FIGS. 5 and 6.

In contrast to the fixed fan blade 506, the moveable fan blades 508, 510, 512 may rotate about the motor shaft relative to the fixed fan blade 506 and relative to each other. As a result, the circumferential spacing between the fan blades 506, 508, 510, 512 about an axis of rotation may vary to be either spaced apart as shown in FIG. 5 or collapsed together as shown in FIG. 6. For example, adjacent ones of the fan blades 506, 508, 510, 512 are rotated 90 degrees apart in FIG. 5 to be evenly distributed around the axis of rotation whereas the fan blades are spaced approximately 30 degrees apart in FIG. 6 to be grouped together within an approximately 90 degree portion of the fan circumference. In some examples, the position of each of the moveable fan blades 508, 510, 512 when evenly distributed (FIG. 5) and when grouped together (FIG. 6) correspond to the outer limits of rotation for each moveable fan blade 508, 510, 512 relative to the fixed fan blade 506. That is, as shown in the illustrated example, the first moveable fan blade 508 adjacent the fixed fan blade 506 has a total path of rotation spanning approximately 60 degrees (e.g., spaced 90 degrees away from the fixed fan blade 506 in FIG. 5 and 30 degrees in FIG. 6). The second moveable fan blade 510 in the illustrated example has a total path of rotation spanning approximately 120 degrees (e.g., spaced 180 degrees away from the fixed fan blade 506 in FIG. 5 and 60 degrees in FIG. 6). The third moveable fan blade 512 in the illustrated example has a total path of rotation spanning approximately 180 degrees (e.g., spaced 270 degrees (in the counterclockwise direction) away from the fixed fan blade 506 in FIG. 5 and 90 degrees in FIG. 6).

When the fan blades 506, 508, 510, 512 are grouped together, as shown in the illustrated example of FIG. 6, the blades form an eccentric mass 518 that may cause a desired vibration effect when rotated by the motor 502. Thus, the collapsible nature of the fan 504 enables the cooling fan assembly 500 to operate in both a cooling mode (when the blades are symmetrically distributed as in FIG. 5) and a vibration mode (when the blades are asymmetrically distributed as in FIG. 6) using a single motor 502. Moreover, the example cooling fan assembly 500 does not need a separate eccentric mass coupled to the motor 502 independent of the fan 504 as in the examples of FIGS. 1-4. In some examples, the fan blades 506, 508, 510, 512 are made from a relatively heavy material (e.g., metal) to provide sufficient weight to the eccentric mass 518 to produce a desired vibration effect.

The free rotation of the moveable fan blades 508, 510, 512 relative to the fixed fan blade 506, in connection with the different limits of travel for each of the moveable fan blades 508, 510, 512, enables the blades to be either evenly distributed (FIG. 5) or grouped together (FIG. 6) depending on the direction that the cooling fan 504 is rotated. More particularly, as the fan 504 rotates inertia will cause the moveable fan blades 508, 510, 512 to move to the limit of their respective travels paths in the direction opposite the direction of rotation. Thus, in some examples, when the fan 504 (specifically, the fixed fan blade 506 with the associated hub 514 rigidly coupled to the motor shaft) is rotated in a first direction 520 (clockwise in the illustrated example), inertia causes the moveable fan blades 508, 510, 512 to shift to their respective positions associated with the even distribution of the blades (FIG. 5). This even or balanced spacing of the blades (as shown in FIG. 5) enables the fan to function as a typical fan that causes air to move and, thus, can be used to cool electrical components. Conversely, when the fan 504 is rotated in a second direction 602 (counterclockwise in the illustrated example), inertia causes the fan blades to collapse to their respective positions when in the grouped configuration (FIG. 6).

Figure 7:
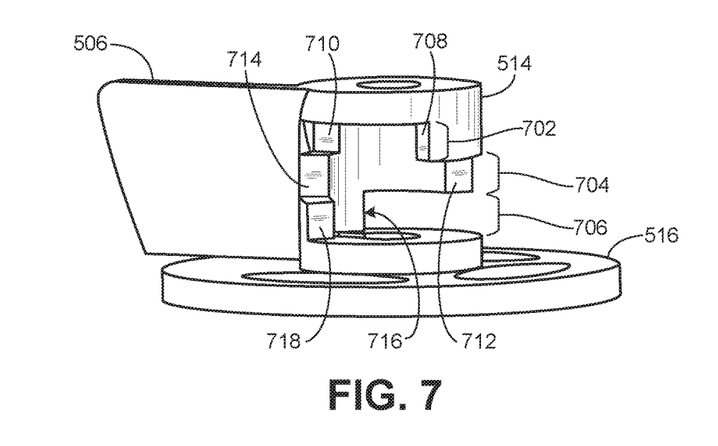
FIG. 7 illustrates the example fixed fan blade of the example collapsible fan of FIGS. 5 and 6.
Figure 8:
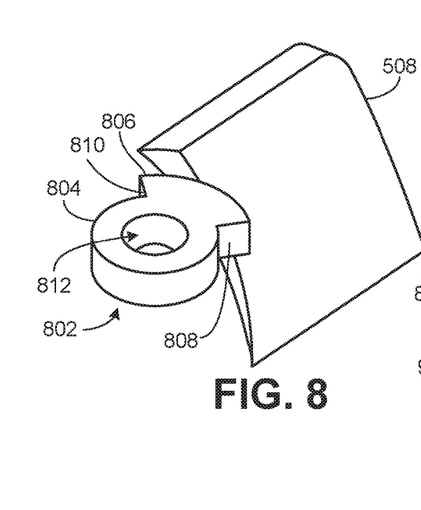
FIGS. 8-10 illustrate each of the example moveable fan blades of the example collapsible fan of FIGS. 5 and 6.
Figure 9:
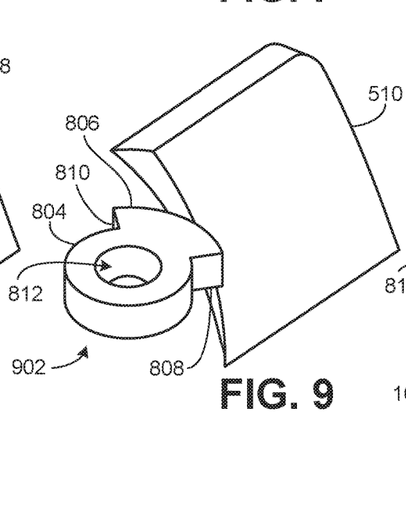
Figure 10:
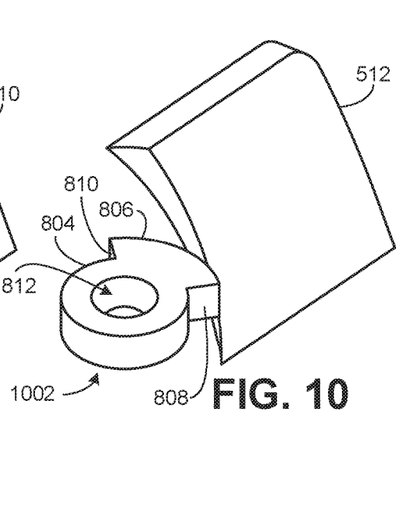
Figure 11:
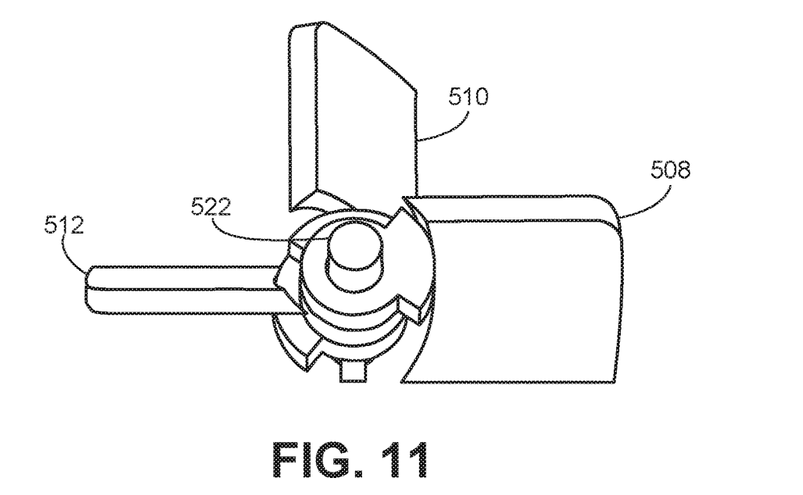
FIG. 11 illustrates the example moveable fan blades of the example collapsible fan of FIGS. 5 and 6 arranged in the cooling mode.
Figure 12:
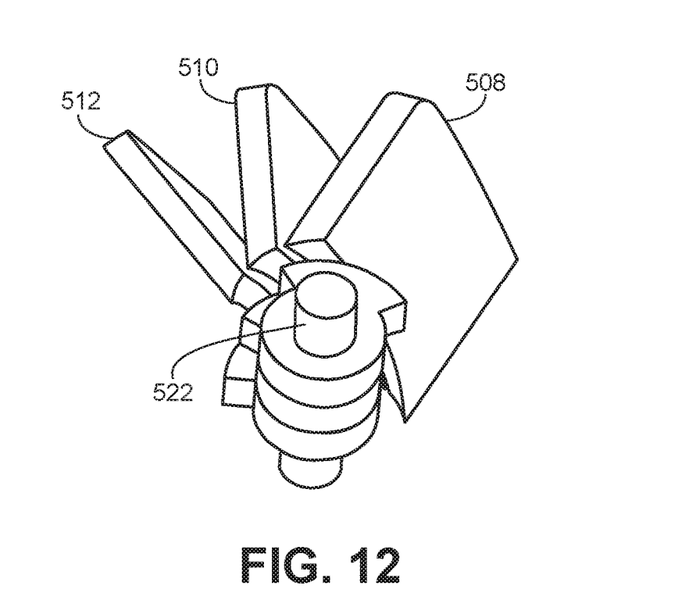
FIG. 12 illustrates the example moveable fan blades of the example collapsible fan of FIGS. 5 and 6 arranged in the vibration mode.

In some examples, the relative shifting or movement of the blades 506, 508, 510, 512 about a central axis is enabled by the design and meshing of the moveable fan blades 508, 510, 512 with the hub 514 connected to the fixed fan blade 506. In particular, FIG. 7 illustrates the example fixed fan blade 506 integrally formed with the hub 514 and the base plate 516 prior to assembly with the moveable fan blades 508, 510, 512. FIGS. 8-10 illustrate each of the moveable fan blades 508, 510, 512, respectively, in the same orientation for comparison. FIG. 11 illustrates the example moveable fan blades 508, 510, 512 in assembled relationship with the fixed fan blade omitted when spaced a maximum distance apart (corresponding to the evenly distributed configuration of FIG. 5). FIG. 12 illustrates the example moveable fan blades 508, 510, 512 in assembled relationship with the fixed fan blade omitted when spaced a minimum distance apart (corresponding to the grouped configuration of FIG. 6).

As shown in the illustrated example of FIG. 7, the hub 514 is a cylindrical tube with three slots 702, 704, 706 extending different circumferential lengths around the wall of the hub 514. More particularly, the arc length of the first (upper most) slot 702 in the illustrated example is delimited by a first leading surface 708 and a first trailing surface 710 traversing the wall of the hub 514 in a radial direction relative to the axis of rotation of the fan hub 514. Similarly, the second slot 704 is circumferentially limited to an arc length extending between a second leading surface 712 and a second trailing surface 714. The third slot 706 circumferentially extends between a third leading surface 716 and a third trailing surface 718. The labels of leading surface and trailing surface are provided herein for purposes of explanation. As applied to the illustrated examples, the leading surfaces 708, 712, 716 for each of the slots 702, 704, 706 refers to the surface facing the direction of rotation of the fan 504 in the cooling mode (e.g., the first direction 520 in FIG. 5), whereas the trailing surfaces 710, 714, 718 refers to the surface facing the direction of rotation of the fan 504 in the vibration mode (e.g., the second direction 602 in FIG. 6).

As shown in the illustrated example of FIGS. 8-10, each of the moveable fan blades 508, 510, 512 is connected to a corresponding hub connector 802, 902, 1002 to enable the fan blades to connect with but rotate relative to the hub 514. In the illustrated example, each of the hub connectors 802, 902, 1002 are similarly designed with a disk 804 and a slot guide 806. In some examples, the disk 804 is dimensioned to fit within and rotate relative to the hub 514. The slot guide 806 is dimensioned to fit within and slide along a corresponding one of the slots 702, 704, 706 to guide and limit rotation of the corresponding disk 804 within the hub 514 and the corresponding moveable fan blade 508, 510, 512 outside the hub 514. As shown in the illustrated example of FIG. 7, each slot guide 806 circumferentially extends about the disk 804 between a leading surface 808 (e.g., facing the direction of rotation in the cooling mode) and a trailing surface 810 (e.g., facing the direction of rotation in the vibration mode). While each hub connector 802, 902, 1002 is generally the same in design, the position or placement of each hub connector relative to the corresponding moveable fan blade 508, 510, 512 is different. In particular, as shown in FIG. 8, the first hub connector 802 is connected to the first moveable fan blade 508 near the top of the blade with the blade attached to the slot guide 806 further away from the leading surface 808 of the slot guide 806 than the trailing surface 810 of the slot guide. By contrast, as shown in FIG. 9, the second hub connector 902 is connected to the second moveable fan blade 510 near the middle of the blade with the blade attached to the slot guide 806 near a midpoint between the leading surface 808 and the trailing surface 810 of the slot guide 806. Further, as shown in FIG. 10, the third hub connector 1002 is connected to the third moveable fan blade 512 near the bottom of the blade with the blade attached to the slot guide 806 closer to the leading surface 808 than the trailing surface 810 of the slot guide 806.

The different heights of the hub connectors 802, 902, 1002 relative to the height of each corresponding moveable fan blades 508, 510, 512 is such that the hub connectors 802, 902, 1002 may stack on top of each other with the top and bottom edges of each of the blades 508, 510, 512 being aligned, as shown in FIGS. 11 and 12. Further, the height of each hub connectors 802, 902, 1002 on each moveable fan blade 508, 510, 512 is associated with the height of a corresponding slot 702, 704, 706 in the hub 514. That is, when the fan 504 is assembled, as shown in the illustrated example of FIGS. 5 and 6, the first hub connector 802 (corresponding to the first moveable fan blade 508) is associated with the first slot 702, the second hub connector 902 (corresponding to the second moveable fan blade 510) is associated with the second slot 704, and the third hub connector 1002 (corresponding to the third moveable fan blade 512) is associated with the third slot 704.

As shown in FIG. 7, each of the slots 702, 704, 706 are staggered relative to one another with different arc lengths. However, in each case, the arc length is longer than the arc length of the slot guide 806 of each hub connector 802, 902, 1002. As a result, each slot guide 806 is able to move along the corresponding arced slot as the corresponding disk 804 rotates within the hub 514. The movement of each slot guide 806 is limited by a hard stop when either (1) the leading surface 808 of the slot guide 806 comes into contact with the trailing surface 710, 714, 718 of the corresponding slot 702, 704, 706 or (2) the trailing surface 810 of the slot guide 806 comes into contact with the leading surface 708, 712, 716 of the corresponding slot 702, 704, 706. The amount of rotation of each moveable fan blade 508, 510, 512 relative to the hub 514 (and associated fixed fan blade) corresponds to the difference between the arc length of the slot guide 806 and the arc length of the corresponding slot 702, 704, 706. Thus, although the slot guide 806 for each hub connector 802, 902, 1002 has the same arc length in the illustrated examples, the third moveable fan blade 512 can rotate along a much larger travel path than the first moveable fan blade 508 because the third slot 706 (associated with the third moveable fan blade 512) has a much longer arc length than the first slot 702 (associated with the third moveable fan blade 512).

In some examples, the relative length of each slot guide 806 to the corresponding slot 702, 704, 706, along with the particular point of attached of each moveable fan blade 508, 510, 512 to the corresponding slot guide 806, results in the fan blades being evenly distributed about the hub 514 (as in FIG. 5) when the trailing surface 810 of each slot guide 806 is abutting the leading surface 708, 712, 716 of each corresponding slot 702, 704, 706. The hard stop between the surface of the slot guides 806 and the slots 702, 704, 706 ensures that torque from the motor 502 driving the hub 514 is transferred to the moveable fan blades 508, 510, 512 so that the entire fan 504 rotates as a unit in the first direction 520 to blow air as needed to cool electrical components. In the same manner, the fan 504 may collapse with the fan blades 506, 508, 510, 512 grouped together to form the eccentric mass 518 (as in FIG. 6) when the leading surface 808 of each slot guide 806 is abutting the trailing surface 710, 714, 718 of each corresponding slot 702, 704, 706. Again, the mechanical interfacing of the surfaces of the slot guides 806 and the slots 702, 704, 706 ensures that the entire fan 504 rotates as a unit in the second direction 602 to cause a desired vibration effect due to the rotation of the eccentric mass 518.

In some examples, each slot 702, 704, 706 extends at least half way around the circumference of the hub 514 to enable the disk 804 of each hub connector 802, 902, 1002 to slide through each corresponding slot. In some examples, each disk 804 includes a hole 812 through which a pin 522 (FIG. 5) may extend to secure the hub connectors 802, 902, 1002 within the hub 514 during operation. In some examples, at least some of the slots 702, 704, 706 may extend less than half way around the circumference of the hub 514 such that the wall of the hub 514 holds the corresponding disk 804 in place without a pin. In some such examples, the corresponding disk 804 may be slid into position from above or below the slot (e.g., after being slid in through a larger slot and/or from an end of the hub 514 that is subsequently closed off).

While FIGS. 5-12 illustrate an example cooling fan assembly 500 that may be constructed in accordance with the teachings disclosed herein, different designs are possible. For example, the fan may include a fewer fan blades than is shown in the figures (e.g., 2 or 3) or more fan blades than are shown (e.g., 5, 6, 7, etc.). Further, in some examples, there may be a different number of fixed fan blades. In particular, in some examples, all of the blades may be rotatable relative to the hub 514 (and connected motor shaft). In other examples, more than one blade may be fixed to the hub 514. In some examples, this may result in more than one grouping of fan blades when collapsed to form one or more eccentric masses.

Furthermore, the stacked order of the slots 702, 704, 706 may be different than as shown (e.g., the longest slot may be on top rather than the bottom). Further, while the slots 702, 704, 706 of the illustrated example are interconnected (e.g., they are part of a single cut out of the hub 514), in other examples, the slots 702, 704, 706 may be spaced apart with portions of the hub wall extending circumferentially all the way around the hub 514 between adjacent slots 702, 704, 706. In some such examples, spacers may be placed between each disk 804 when installed in the hub 514 to maintain stability.

Additionally, in some examples, the relative arc lengths of the slots 702, 704, 706 and corresponding slot guides 806 may be different than as shown in the illustrated example. This may result from fan designs that include a different number of blades. However, even where only four blades are used, as shown in the illustrated examples, the arc lengths may still be different. For instance, in contrast to the illustrated example, each of the slots 702, 704, 706 may have the same length while the slot guide 806 associated with each moveable fan blade 508, 510, 512 is different than other ones of the slot guides. Furthermore, although the slot guides 806 are described as limiting the rotational travel path of the moveable fan blades 508, 510, 512 based on their contact with the end surfaces of the slots 702, 704, 706 in the hub wall, other mechanical stops may alternatively be used. For example, a protrusion out of the hub 514 or into the hub 514 may interface with a corresponding face on the disk 804, the slot guide 806, and/or the fan blade. In some examples, the fan blades themselves may come into contact when in the collapsed or grouped configuration.

Figure 13:
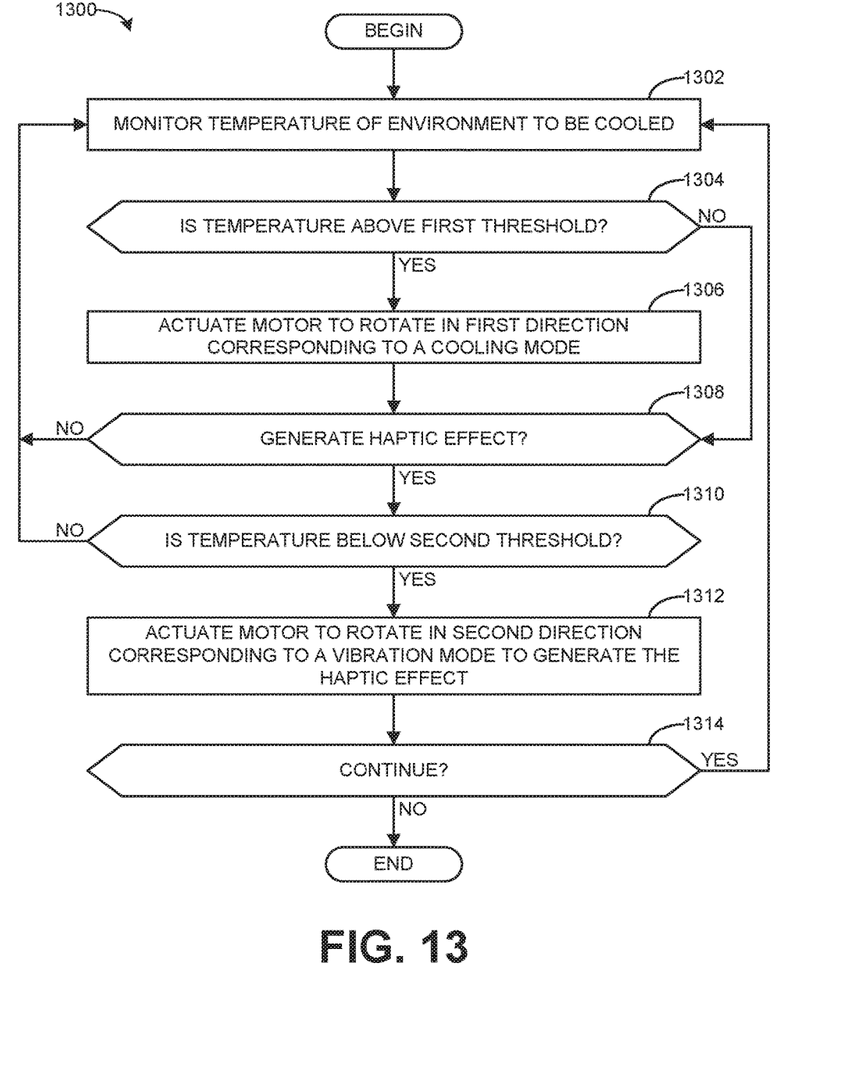
FIG. 13 is a flowchart representative of example machine-readable instructions that may be executed to implement the example controller of FIG. 1.

A flowchart representative of example machine readable instructions for implementing the electronic device 100 of FIG. 1 is shown in FIG. 13. In this example, the machine readable instructions comprise a program for execution by a processor such as the processor 1412 shown in the example processor platform 1400 discussed below in connection with FIG. 14. The program may be embodied in software stored on a tangible computer readable storage medium such as a CD-ROM, a floppy disk, a hard drive, a digital versatile disk (DVD), a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowchart illustrated in FIG. 13, many other methods of implementing the example electronic device 100 may alternatively be used. For example, the order of execution of the blocks may be changed, and/or some of the blocks described may be changed, eliminated, or combined.

As mentioned above, the example process of FIG. 13 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 13 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program of FIG. 13 begins at block 1302 where the example temperature sensor 118 monitors a temperature of an environment to be cooled (e.g., the electronic device 100). At block 1304, the example motor controller 116 determines whether the temperature is above a first threshold. If so, control advances to block 1306 where the example motor controller 116 actuates the motor 104 to rotate in a first direction corresponding to a cooling mode. Thereafter, control advances to block 1308. If the motor controller 116 determines that the temperature is not above the first threshold (block 1304), control advances directly to block 1308.

At block 1308, the example haptic effect module 120 determines whether to generate a haptic effect. If no haptic effect is to be generated, control returns to block 1302. If a haptic effect is to be generated, control advances to block 1310 where the example motor controller 116 determines whether the temperature is below a second threshold. In some examples, the second threshold is higher than the first threshold. More particularly, the first threshold may correspond to a temperature at which the cooling fan assembly 102 needs to be activated to force air to cool electrical components. The second threshold may correspond to a critical temperature at which electrical components need constant movement of air to prevent the electrical components from overheating. That is, in some examples, even momentary breaks from the rotation of the cooling fan assembly (e.g., to reverse the direction of the motor 104 to generate a haptic effect) may be undesirable. In such examples, the motor controller 116 may override the request to generate the haptic effect to ensure that the cooling fan assembly 102 continues to operate in the cooling mode. Thus, if the example motor controller 116 determines that the temperature is not below the second threshold (block 1310), control returns to block 1302.

However, if the example motor controller 116 determines that the temperature is below the second threshold (block 1310), control advances to block 1312 where the example motor controller 116 actuates the motor 104 to rotate in a second direction corresponding to a vibration mode to generate the haptic effect. At block 1314, the motor controller 116 determines whether to continue. If so, control returns to block 1302. Otherwise, the example program of FIG. 13 ends.

Figure 14:
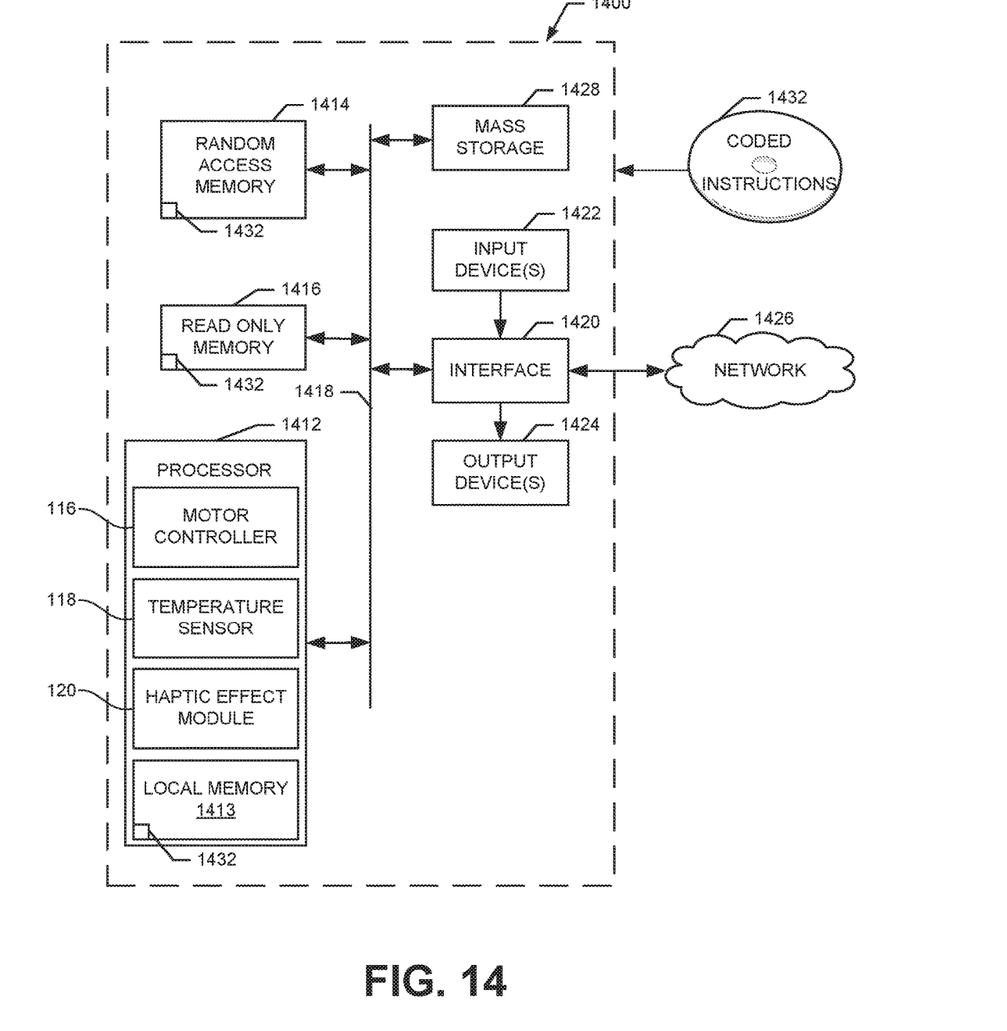
FIG. 14 is a block diagram of an example processor platform capable of executing the example machine-readable instructions of FIG. 13 to implement the example controller of FIG. 1.

FIG. 14 is a block diagram of an example processor platform 1400 capable of executing the instructions of FIG. 13 to implement the electronic device 100 of FIG. 1. The processor platform 1400 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1400 of the illustrated example includes a processor 1412 to implement the example motor controller 116, the temperature sensor 118, and/or the haptic effect module 120. The processor 1412 of the illustrated example is hardware. For example, the processor 1412 can be implemented by one or more integrated circuits, logic circuits, microprocessors or controllers from any desired family or manufacturer.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit

1420 may be implemented by any type of interface standard, such as an Ethernet interface, a universal serial bus (USB), and/or a PCI express interface.

In the illustrated example, one or more input devices 1422 are connected to the interface circuit 1420. The input device(s) 1422 permit(s) a user to enter data and commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1420 of the illustrated example, thus, typically includes a graphics driver card, a graphics driver chip or a graphics driver processor.

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an Ethernet connection, a digital subscriber line (DSL), a telephone line, coaxial cable, a cellular telephone system, etc.).

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, RAID systems, and digital versatile disk (DVD) drives.

The coded instructions 1432 of FIG. 13 may be stored in the mass storage device 1428, in the volatile memory 1414, in the non-volatile memory 1416, and/or on a removable tangible computer readable storage medium such as a CD or DVD.

From the foregoing, it will be appreciated that the above disclosed methods, apparatus and articles of manufacture enable the generation of forced air for cooling electrical components and the generation of vibrations to produce desired haptic effects using only a single motor that may operate in either a cooling mode or a vibration mode. The examples disclosed herein eliminate the need for two separate motors, along with their corresponding housings and driver circuitry, thereby reducing the overall spacing requirements to approximately half the size of other known systems. Furthermore, the elimination of the need for a second motor and the associated components also has the potential to reduce the overall cost of components used in manufacturing electronic devices that implement the example cooling fan assemblies described herein.

Example 1 is a cooling fan assembly that includes a motor and a fan coupled to a shaft of the motor. The motor is to rotate the shaft in a first direction to cause the fan to move air. The motor is to rotate the shaft in a second direction to move an eccentric mass coupled to the shaft to cause vibration.

Example 2 includes the subject matter of Example 1, wherein the shaft is to rotate in the first direction without causing the vibration.

Example 3 includes the subject matter of any one of Examples 1 or 2, wherein the eccentric mass is coupled to the shaft independent of the fan.

Example 4 includes the subject matter of any one of Examples 1-3, wherein the motor is disposed between the fan and the eccentric mass.

Example 5 includes the subject matter of any one of Examples 1-3, wherein the fan is disposed between the motor and the eccentric mass.

Example 6 includes the subject matter of any one of Examples 1-3, wherein the eccentric mass is disposed between the fan and the motor.

Example 7 includes the subject matter of any one of Examples 1-6, and further includes a freewheel device to couple the eccentric mass to the shaft. The freewheel device is to enable rotation of the shaft in the first direction without corresponding rotation of the eccentric mass.

Example 8 includes the subject matter of any one of Examples 1-7, and further includes a magnet to magnetically hold the eccentric mass in place when the shaft is rotated in the first direction.

Example 9 includes the subject matter of any one of Examples 6 or 7, and further includes a second freewheel device to couple the fan to the shaft. The second freewheel device is to enable rotation of the shaft in the second direction without corresponding rotation of the fan.

Example 10 includes the subject matter of any one of Examples 1, 2, or 7-9, wherein the fan includes a plurality of fan blades. The eccentric mass to be formed by the fan blades when the shaft is rotated in the second direction.

Example 11 includes the subject matter of Example 10, wherein the plurality of fan blades are made of metal.

Example 12 includes the subject matter of any one of Examples 10 or 11, wherein the plurality of fan blades are to be substantially evenly distributed in a circumferential direction about the shaft when the shaft is rotated in the first direction. The plurality of fan blades are to be eccentrically grouped together in the circumferential direction about the shaft when the shaft is rotated in the second direction. The eccentrically grouped fan blades form the eccentric mass.

Example 13 includes the subject matter of any one of Examples 10-12, wherein ones of the plurality of fan blades are rotatable about the shaft relative to other ones of the plurality of fan blades to change a circumferential spacing between adjacent ones of the plurality of fan blades.

Example 14 includes the subject matter of any one of Examples 10-13, wherein the circumferential spacing between the adjacent ones of the plurality of fan blades is reduced when the shaft is rotated in the second direction relative to the circumferential spacing when the shaft is rotated in the first direction.

Example 15 includes the subject matter of any one of Examples 1-14, wherein the fan is an axial fan.

Example 16 includes the subject matter of any one of Examples 1-14, wherein the fan is a radial fan.

Example 17 includes the subject matter of any one of Examples 1-16, wherein the fan assembly has a length extending parallel to the shaft and a width extending perpendicular to the shaft.

Example 18 includes the subject matter of Example 17, wherein the length is greater than the width.

Example 19 includes the subject matter of Example 17, wherein the width is greater than the length.

Example 20 includes the subject matter of any one of Examples 17 or 19, wherein the width ranges from approximately 10 mm to 20 mm and the length ranges from approximately 3 mm to 5 mm.

Example 21 is a cooling fan assembly that includes a fan and a motor to rotate the fan via a shaft. The motor is to generate vibrations less than a threshold when rotating the shaft in a first direction and to generate vibrations exceeding the threshold when rotating the shaft in a second direction.

Example 22 includes the subject matter of Example 21, wherein the vibrations exceeding the threshold are caused by an eccentric mass rotationally coupled to the shaft when rotating in the second direction.

Example 23 includes the subject matter of Example 22, wherein the shaft is to freely rotate relative to the eccentric mass when the shaft is rotated in the first direction. The eccentric mass to rotate with the shaft when the shaft is rotated in the second direction.

Example 24 includes the subject matter of any one of Examples 22 or 23, further including a freewheel device to couple the eccentric mass to the shaft.

Example 25 includes the subject matter of any one of Examples 22-24, further including a magnet to prevent rotation of the eccentric mass when the shaft is rotated in the first direction.

Example 26 includes the subject matter of any one of Examples 21-25, wherein the fan includes a plurality of fan blades, a first one of the fan blades to be rigidly fixed relative to rotation of the shaft, a second one of the fan blades to be rotatable about the shaft relative the first fan blade.

Example 27 includes the subject matter of Example 26, wherein the second fan blade is to be spaced apart from the first fan blade a first circumferential distance when the shaft is rotated in the first direction, the second fan blade to be spaced apart from the first fan blade a second circumferential distance when the shaft is rotated in the second direction, the second circumferential distance being smaller than the first circumferential distance.

Example 28 is a method to operate a cooling fan assembly that includes driving a motor to rotate a shaft in a first direction. A fan is to rotate with the shaft in the first direction to force movement of air. The method further includes driving the motor to rotate the shaft in a second direction to generate a vibration effect. An eccentric mass is rotationally coupled to the shaft when the shaft is rotated in the second direction to generate the vibration effect.

Example 29 includes the subject matter of Example 28, and further including monitoring a temperature of an environment to be cooled by the movement of the air. The method further includes preventing the motor from rotating the shaft in the second direction when the temperature exceeds a threshold.

Example 30 includes the subject matter of any one of Examples 28 or 29, wherein the eccentric mass is coupled to the shaft via a freewheel device.

Example 31 includes the subject matter of any one of Examples 28 or 29, wherein blades of the fan rotate relative to one another about the shaft. The blades are symmetrically distributed about the shaft when the shaft is rotated in the first direction. The blades are asymmetrically distributed about the shaft when the shaft is rotated in the second direction.

Example 32 includes the subject matter of any one of Examples 28, 29, or 31, wherein the eccentric mass corresponds to the blades when asymmetrically distributed.

Example 33 is a tangible computer readable storage medium comprising instructions that, when executed, cause a machine to at least drive a motor to rotate a shaft in a first direction. A fan is to rotate with the shaft in the first direction to force movement of air. The instructions further cause the machine to drive the motor to rotate the shaft in a second direction to generate a vibration effect. An eccentric mass rotationally coupled to the shaft when the shaft is rotated in the second direction to generate the vibration effect.

Example 34 includes the subject matter of Example 33, wherein the instructions, when executed, further cause the machine to monitor a temperature of an environment to be cooled by the movement of the air. The instructions further cause the machine to prevent the motor from rotating the shaft in the second direction when the temperature exceeds a threshold.

Example 35 includes the subject matter of any one of Examples 33 or 34, wherein the eccentric mass is coupled to the shaft via a freewheel device.

Example 36 includes the subject matter of any one of Examples 33 or 34, wherein blades of the fan rotate relative to one another about the shaft, the blades symmetrically distributed about the shaft when the shaft is rotated in the first direction, the blades asymmetrically distributed about the shaft when the shaft is rotated in the second direction.

Example 37 includes the subject matter of any one of Examples 33, 34, or 36, wherein the eccentric mass corresponds to the blades when asymmetrically distributed.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A cooling fan assembly comprising:
   a motor;
   a fan coupled to a shaft of the motor, the motor to rotate the shaft in a first direction to cause the fan to move air, the motor to rotate the shaft in a second direction to move an eccentric mass coupled to the shaft to cause vibration;
   a first freewheel device to couple the eccentric mass to the shaft, the first freewheel device to enable rotation of the shaft in the first direction without corresponding rotation of the eccentric mass; and
   a second freewheel device to couple the fan to the shaft, the second freewheel device to enable rotation of the shaft in the second direction without corresponding rotation of the fan.

2. The cooling fan assembly of as defined in claim 1, wherein the shaft is to rotate in the first direction without causing the vibration.

3. The cooling fan assembly as defined in claim 1, wherein the eccentric mass is coupled to the shaft independent of the fan.

4. A cooling fan assembly comprising:
   a motor;
   a fan coupled to a shaft of the motor, the motor to rotate the shaft in a first direction to cause the fan to move air, the motor to rotate the shaft in a second direction to move an eccentric mass coupled to the shaft to cause vibration;
   a freewheel device to couple the eccentric mass to the shaft, the freewheel device to enable rotation of the shaft in the first direction without corresponding rotation of the eccentric mass; and
   a magnet to magnetically hold the eccentric mass in place when the shaft is rotated in the first direction.

5. A cooling fan assembly comprising:
   a motor; and
   a fan coupled to a shaft of the motor, the motor to rotate the shaft in a first direction to cause the fan to move air, the motor to rotate the shaft in a second direction to move an eccentric mass coupled to the shaft to cause vibration, the fan including a plurality of fan blades, the eccentric mass to be formed by the fan blades when the shaft is rotated in the second direction, the plurality of fan blades to be substantially evenly distributed in a circumferential direction about the shaft when the shaft is rotated in the first direction, the plurality of fan blades to be eccentrically grouped together in the circumferential direction about the shaft when the shaft is rotated in the second direction.

6. A cooling fan assembly comprising:
a motor; and
a fan coupled to a shaft of the motor, the motor to rotate the shaft in a first direction to cause the fan to move air, the motor to rotate the shaft in a second direction to move an eccentric mass coupled to the shaft to cause vibration, the fan including a plurality of fan blades, the eccentric mass to be formed by the fan blades when the shaft is rotated in the second direction, ones of the plurality of fan blades are rotatable about the shaft relative to other ones of the plurality of fan blades to change a circumferential spacing between adjacent ones of the plurality of fan blades.

7. The cooling fan assembly as defined in claim 6, wherein the circumferential spacing between the adjacent ones of the plurality of fan blades is reduced when the shaft is rotated in the second direction relative to the circumferential spacing when the shaft is rotated in the first direction.

8. A cooling fan assembly comprising:
a fan; and
a motor to rotate the fan via a shaft, the motor to generate vibrations less than a threshold by rotating the shaft in a first direction and to generate vibrations greater than the threshold by rotating the shaft in a second direction, the fan including a plurality of fan blades, a first one of the fan blades to be rigidly fixed relative to rotation of the shaft, a second one of the fan blades to be rotatable about the shaft relative the first fan blade.

9. The cooling fan assembly as defined in claim 8, further including an eccentric mass rotationally coupled to the shaft to cause the vibrations greater than the threshold by rotating the shaft in the second direction.

10. The cooling fan assembly as defined in claim 9, wherein the shaft is to freely rotate relative to the eccentric mass when the shaft is rotated in the first direction, the eccentric mass to rotate with the shaft when the shaft is rotated in the second direction.

11. The cooling fan assembly as defined in claim 8, wherein the second fan blade is to be spaced apart from the first fan blade a first circumferential distance when the shaft is rotated in the first direction, the second fan blade to be spaced apart from the first fan blade a second circumferential distance when the shaft is rotated in the second direction, the second circumferential distance being smaller than the first circumferential distance.

12. A tangible computer readable storage medium comprising instructions that, when executed, cause a machine to at least:
rotate a shaft in a first direction, a fan having a plurality of fan blades to rotate with the shaft in the first direction to force movement of air; and
rotate the shaft in a second direction to cause a first one of the fan blades to rotate about the shaft relative to a second one of the fan blades to generate a vibration effect.

13. The storage medium as defined in claim 12, wherein the instructions, when executed, further cause the machine to:
monitor a temperature of an environment to be cooled by the movement of the air; and
prevent the shaft from rotating in the second direction when the temperature exceeds a threshold.

14. The cooling fan assembly as defined in claim 1, wherein the motor is disposed between the fan and the eccentric mass.

15. The cooling fan assembly as defined in claim 1, wherein the fan is disposed between the motor and the eccentric mass.

16. The cooling fan assembly as defined in claim 1, wherein the eccentric mass is disposed between the fan and the motor.

17. The cooling fan assembly as defined in claim 1, wherein the fan is an axial fan.

18. The cooling fan assembly as defined in claim 1, wherein the fan is a radial fan.

19. The storage medium as defined in claim 12, wherein the instructions, when executed, further cause the machine to:
monitor a temperature of an environment to be cooled by the movement of the air;
drive the shaft in the first direction when the temperature exceeds a first threshold;
enable a motor to reverse direction to rotate the shaft in the second direction when the temperature exceeds the first threshold and is below a second threshold; and
prevent the motor from rotating the shaft in the second direction when the temperature exceeds the second threshold.

* * * * *